US010656647B2

(12) United States Patent
Mangal et al.

(10) Patent No.: US 10,656,647 B2
(45) Date of Patent: May 19, 2020

(54) VERIFICATION OF VEHICLE OPERATOR AWARENESS BEFORE TRANSITION FROM AUTONOMOUS-MODE TO MANUAL-MODE

(71) Applicant: Aptiv Technologies Limited, St. Michael OT (BB)

(72) Inventors: Nandita Mangal, Palo Alto, CA (US); Michael H. Laur, Mission Viejo, CA (US)

(73) Assignee: Aptiv Technologies Limited (BB)

( * ) Notice: Subject to any disclaimer, the term of this patent is extended or adjusted under 35 U.S.C. 154(b) by 121 days.

(21) Appl. No.: 16/021,623

(22) Filed: Jun. 28, 2018

(65) Prior Publication Data

US 2020/0004244 A1    Jan. 2, 2020

Related U.S. Application Data

(60) Provisional application No. 62/690,491, filed on Jun. 27, 2018.

(51) Int. Cl.
*G05D 1/00* (2006.01)
*B60W 50/14* (2020.01)
*B60W 40/04* (2006.01)

(52) U.S. Cl.
CPC .......... *G05D 1/0088* (2013.01); *B60W 40/04* (2013.01); *B60W 50/14* (2013.01)

(58) Field of Classification Search
CPC .... G05D 1/0088; B60W 40/04; B60W 50/14; B60W 2556/50
See application file for complete search history.

(56) References Cited

U.S. PATENT DOCUMENTS 6,281,806 B1 * 8/2001 Smith .................... B60Q 1/085
340/901
7,362,215 B2 * 4/2008 Janssen .................. G08G 1/166
340/425.5

(Continued)

FOREIGN PATENT DOCUMENTS

EP    1 897 774 A1    3/2008

OTHER PUBLICATIONS

European Search Report for Applicatiaon No. 19182024, European Patent Office, dated Nov. 28, 2019.

*Primary Examiner* — Frederick M Brushaber
(74) *Attorney, Agent, or Firm* — Joseph V. Bonadies

(57) ABSTRACT

A system for operating a vehicle includes an object-detector, and operator-monitor, and a controller. The object-detector is used to detect one or more targets proximate to a host-vehicle, said host-vehicle operable in an autonomous-mode and a manual-mode. The operator-monitor is used to detect a gaze-direction of an operator of the host-vehicle. The controller-circuit is in communication with the object-detector and the operator-monitor. The controller-circuit is configured to determine a classification of each target detected by the object-detector. The classification includes a primary-target and an ignored-target. The controller-circuit is further configured to determine that a hand-over of operation of the host-vehicle from the autonomous-mode to the manual-mode is recommended, perform a verification that the operator has gazed at each primary-target more recently than a primary-time, and in response to the verification, execute the hand-over.

15 Claims, 3 Drawing Sheets

(56) References Cited

U.S. PATENT DOCUMENTS

| | | | | |
|---|---|---|---|---|
| 7,400,233 | B2* | 7/2008 | Kondo | B60Q 9/008 |
| | | | | 340/435 |
| 7,813,844 | B2* | 10/2010 | Gensler | B62D 15/0285 |
| | | | | 348/113 |
| 8,638,205 | B2* | 1/2014 | Boehme | E05F 15/43 |
| | | | | 340/436 |
| 8,749,401 | B2* | 6/2014 | Hara | B60Q 1/50 |
| | | | | 340/425.5 |
| 8,818,609 | B1* | 8/2014 | Boyko | G01S 17/931 |
| | | | | 701/28 |
| 9,080,866 | B1* | 7/2015 | Dowdall | G01S 17/04 |
| 9,092,986 | B2* | 7/2015 | Salomonsson | F02D 41/065 |
| 9,097,800 | B1* | 8/2015 | Zhu | G01S 17/42 |
| 9,164,507 | B2* | 10/2015 | Cheatham, III | G05D 1/0088 |
| 9,168,867 | B2* | 10/2015 | Tamatsu | G08G 1/005 |
| 9,234,618 | B1* | 1/2016 | Zhu | G05D 1/0088 |
| 9,286,520 | B1* | 3/2016 | Lo | G06K 9/00791 |
| 9,649,936 | B2* | 5/2017 | Yamada | B60K 37/04 |
| 9,707,942 | B2* | 7/2017 | Cheatham, III | B60T 7/12 |
| 9,744,901 | B2* | 8/2017 | Goto | B60Q 1/085 |
| 9,915,951 | B2* | 3/2018 | Mei | G01S 13/931 |
| 2014/0330479 | A1* | 11/2014 | Dolgov | B60W 30/143 |
| | | | | 701/28 |
| 2014/0379247 | A1* | 12/2014 | Ferguson | B60W 30/09 |
| | | | | 701/301 |
| 2017/0043768 | A1* | 2/2017 | Prokhorov | B60W 30/0953 |
| 2018/0129891 | A1 | 5/2018 | Ryu et al. | |
| 2018/0173225 | A1 | 6/2018 | Kim et al. | |
| 2019/0019413 | A1* | 1/2019 | Yun | B60W 30/12 |
| 2019/0188499 | A1* | 6/2019 | Hummelshoj | B25J 19/021 |
| 2019/0202464 | A1* | 7/2019 | McGill | G05D 1/0061 |

\* cited by examiner

VERIFICATION OF VEHICLE OPERATOR AWARENESS BEFORE TRANSITION FROM AUTONOMOUS-MODE TO MANUAL-MODE

TECHNICAL FIELD OF INVENTION

This disclosure generally relates to a system for operating a vehicle, and more particularly relates to a system that performs a verification that the operator has gazed at each primary-target more recently than a primary-time before executing a hand-over of vehicle control from an autonomous-mode to a manual-mode.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
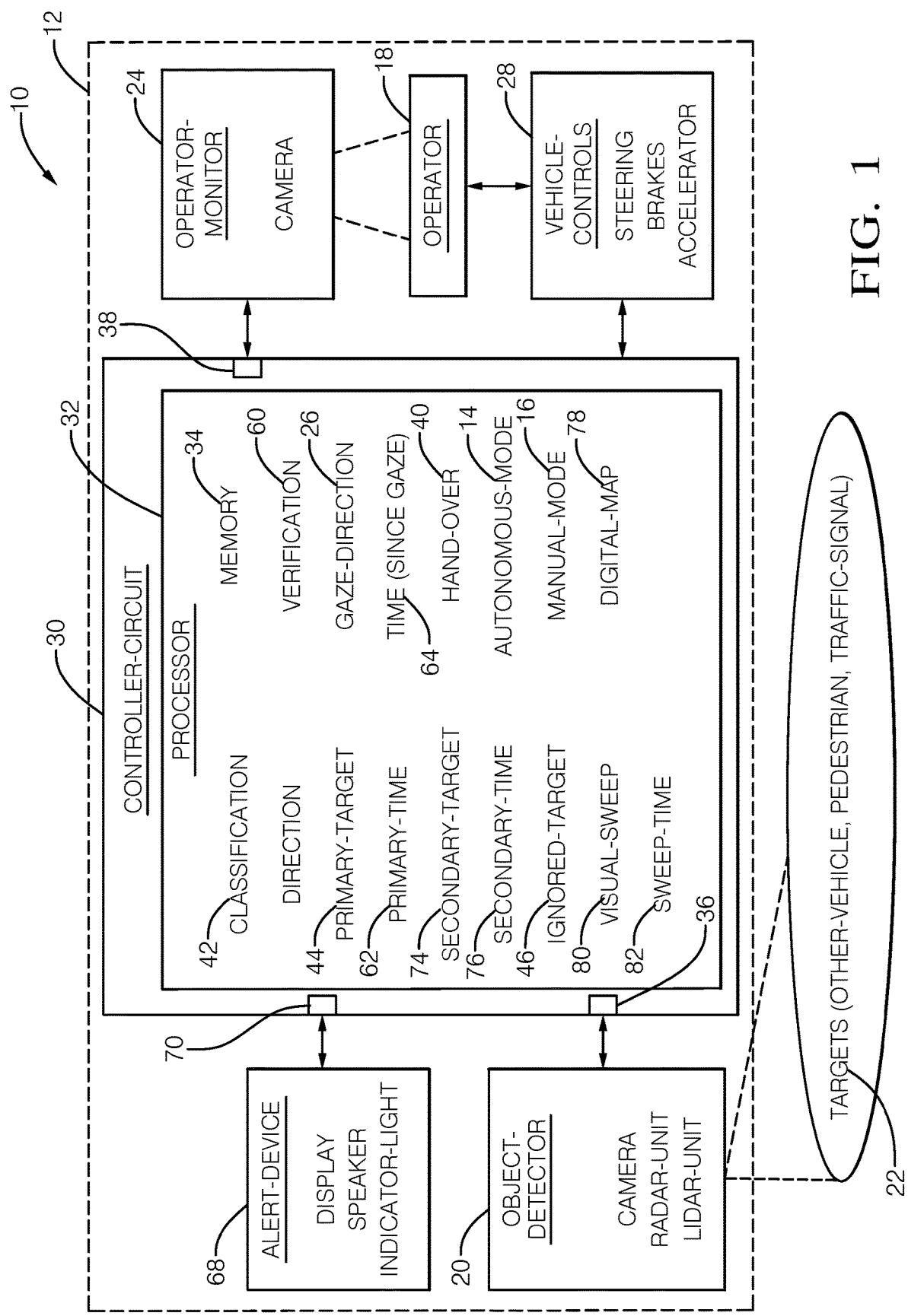
FIG. 1 is a diagram of a system for operating a vehicle in accordance with one embodiment.

FIG. 1 illustrates a non-limiting example of a system 10 for operating a vehicle, e.g. a host-vehicle 12. The host-vehicle 12 may be characterized as an automated vehicle. As used herein, the term automated vehicle is used to characterize a vehicle that is operable in an autonomous-mode 14, i.e. a fully automated mode, where a human-operator, hereafter referred to as the operator 18, of the host-vehicle 12 may do little more than designate a destination to operate the host-vehicle 12. However, full automation is not a full-time requirement. For example, the autonomous-mode 14 may include situations when only the speed control of the host-vehicle 12 is automated, but the steering is controlled by the operator 18. As will be explained in more detail below, some of the unique advantages of the system 10 described herein are found when the host-vehicle 12 transitions from the autonomous-mode 14 to a manual-mode 16 where the degree or level of automation may be little more than providing an audible or visual warning to the human-operator who is generally in control of the steering, accelerator, and brakes of the host-vehicle 12.

The system 10 includes an object-detector 20 that may consist of or include one or more instances of a camera, a radar, a lidar, ultrasonic-transducer, or any combination thereof. One function of the object-detector 20 is that the object-detector 20 is used to detect one or more targets 22 (e.g. other-vehicles, pedestrians, traffic-signals) proximate to (e.g. within 100 m) the host-vehicle 12. The methods and algorithm used to process information from the devices that form the object-detector 20 to detect the targets 22 are well-known to those in the automated-vehicle arts. While the various devices that form the object-detector 20 are shown as being part of, e.g. mounted on, the host-vehicle 12, this is not a requirement. It is contemplated that off-board devices such as a traffic observation camera mounted on a pole or traffic-signal may provide information or images to the host-vehicle 12. As previously mentioned, the host-vehicle 12 is operable in an autonomous-mode and a manual-mode.

The system 10 includes an operator-monitor 24 used to, among other possible uses or functions, detect a gaze-direction 26 of the operator 18 of the host-vehicle 12. The operator-monitor 24 may consist of or be formed of one or more instances of an infrared (IR) and/or visible light interior camera, a radar, and/or an ultrasonic transducer. As used herein, the gaze-direction 26 is characterized as where the operator 18 is looking inside or outside of the host-vehicle 12. For example, looking forward toward another-vehicle in front of the host-vehicle 12, looking at a rear-view or side-view mirror of the host-vehicle 12 to observe another-vehicle behind or beside the host-vehicle 12, or making the necessary head and eye movement to check the so-called blind-spots beside and partially behind the host-vehicle 12. The methods and algorithm used to process information from the devices that form the operator-monitor 24 to detect the gaze-direction 26 toward something within or outside of the host-vehicle 12 are well-known to those in the driver monitoring arts.

The system 10 includes a controller-circuit 30 in communication with the object-detector 20 via a first-input 36, the operator-monitor 24 via a second-input 38, and the vehicle-controls 28 that allow for automated and manual operation of, but not limited to, the steering, the brakes, and the accelerator of the host-vehicle 12. The communication may be via wires, optical-fiber, or wireless communications as will be recognized by those in the art. The controller-circuit 30, hereafter sometimes referred to as the controller 30, may include one or more instances of a processor 32 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 30, it is recognized that the functions of the controller 30 may be shared or distributed among several instances of controllers that are each configured for some specific task. Hereafter, any reference to the controller 30 being configured for something is to also be interpreted as suggesting that the processor 32 may also be configured for the same thing. It is also recognized that there may be multiple instances of processors in any instance of the controller 30. The controller 30 may include memory 34, i.e. non-transitory computer-readable storage-medium, including non-volatile memory, such as electrically erasable programmable read-only memory (EEPROM) for storing one or more routines, thresholds, and captured data. The memory 34 may be part of the processor 32, or part of the controller 30, or separate from the controller 30 such as remote memory stored in the cloud. The one or more routines may be executed by the controller 30 or the processor 32 to perform steps for determining the relative location of various instances of the targets 22 and the gaze-direction 26 of the operator 18 based on signals received by the controller 30 as described herein.

Figure 2:
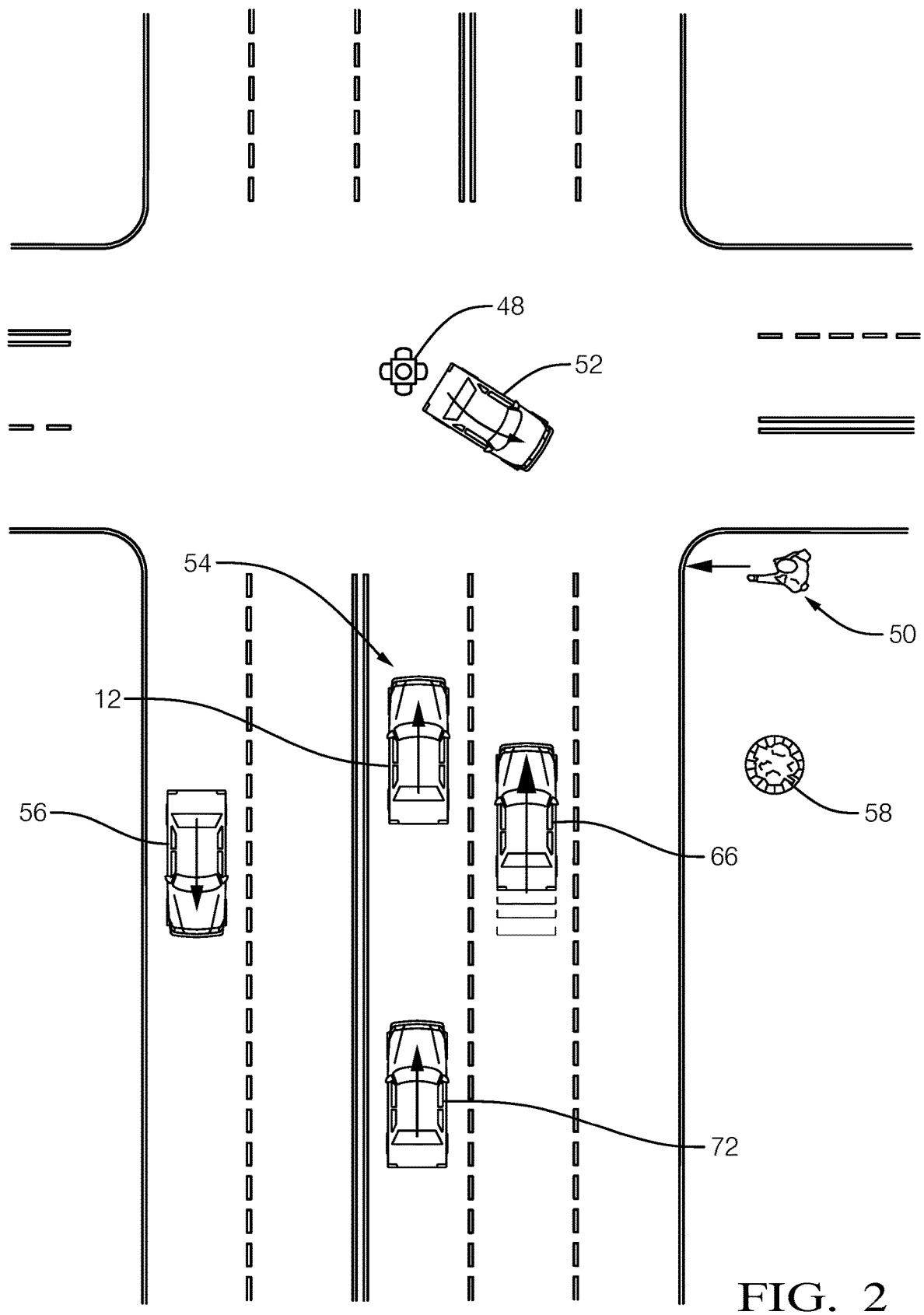
FIG. 2 is a scenario encountered by the system of FIG. 1 in accordance with one embodiment.

FIG. 2 illustrates a non-limiting example of a scenario 38 that the host-vehicle 12 may encounter. Situations have been observed while an automated vehicle such as the host-vehicle 12 is being operated in the autonomous-mode 14 where the operation of the host-vehicle 12 should be transitioned from the autonomous-mode 14 to the manual-mode. Examples of such situations include, but are not limited to, failure of or damage to one or more of the devices that form the object-detector 20, or approaching a construction-zone or accident-site where available travel-paths for the host-vehicle 12 do not correspond to the configuration of a roadway indicated in a digital-map. When a situation is detected by the system 10 where a transition from the autonomous-mode 14 to the manual-mode 16 is recommended, hereafter sometime referred to as a hand-over 40 (FIG. 1), the system 10 described herein verifies that the operator 18 is aware of the presence of the targets 22 before completing the hand-over 40. As used herein, the hand-over 40 is characterized as being initiated by the system 10, and should not be confused with a take-over of control by the operator 18 where the operator 18 initiates the transition from the autonomous-mode 14 to the manual-mode 16.

To this end, the controller 30 is configured to determine a classification 42 of each target 22 detected by the object-detector 20. Options for the classification 42 include, but are not limited to, a primary-target 44 and an ignored-target 46. By way of example and not limitation, an instance of the targets 22 that is classified as the primary-target 44 may be a traffic-signal 48 (FIG. 2), a STOP-sign (not shown), or a pedestrian 50 or an other-vehicle 52 moving on or towards or through a travel-path 54 of the host-vehicle 12, and/or within seventy-five meters (75 m) of the host-vehicle 12. That is, instances of the targets 22 that are assigned the classification 42 of the primary-target 44 are those instances of the targets 22 that the system 10 (i.e. the controller 30 or the processor 32) has deemed to be something that the operator 18 should be aware of, i.e. look at, before the hand-over 40 from the autonomous-mode 14 to the manual-mode 16 is completed.

By contrast, instances of the targets 22 that are assigned the classification 42 of the ignored-target 46 are those instances of the targets 22 that the system 10 (i.e. the controller 30 or the processor 32) has deemed to be something that the operator 18 does not need to look at, before the hand-over 40 from the autonomous-mode 14 to the manual-mode 16 is completed. By way of example and not limitation, an instance of the targets 22 that is classified as the ignored-target 46 may be an opposing-vehicle 56 traveling in the opposite direction as the host-vehicle 12 and already behind or past the host-vehicle 12, or a stationary object well out of the travel-path of the host-vehicle 12 such as a trash-receptacle 58 on the shoulder of the roadway. One possible general definition of which of the targets 22 should be classified as the ignored-target 46 are those instances of the targets 22 that are not moving and not in travel-path or roadway of the host-vehicle.

The tracking and determining the classification 42 of each instance of the targets 22 may be done continuously or periodically while the host-vehicle 12 is being operated in the autonomous-mode 14. When the system 10 determines that the hand-over 40 of operation of the host-vehicle from the autonomous-mode to the manual-mode is recommended, the system 10 (i.e. the controller 30 or the processor 32) is configured perform a verification 60 that the operator 18 has gazed at each instance of the targets 22 that have been assigned the classification 42 of the primary-target 44 more recently than a primary-time 62, for example three seconds (3 s). That is, the verification 60 is a check that gaze-direction 26 of the operator 18 has been directed toward each of the primary targets, and the time 64 since the gaze at each of the primary-targets is less than the primary-time 62. In response to a positive outcome of the verification 60 that each of the primary-targets has been looked at or gazed at more recently than the primary-time 62, the controller 30 executes the hand-over 40.

It is expected that there will be instances when the verification 60 will have a negative outcome, i.e. that the operator 18 has not looked at one or more of the primary-targets for greater than the primary-time 62. FIG. 2 show a passing-vehicle 66 traveling faster than the host-vehicle 12 that is presently in the so-called blind-spot of the operator 18. That the passing-vehicle 66 is traveling faster than the host-vehicle 12, and/or has recently accelerated to the faster speed than the host-vehicle 12 may be an indication that the passing-vehicle 66 intends to change-lanes into the travel-path 54 of the host-vehicle 12. Even if the passing-vehicle 66 were traveling at the same speed as the host-vehicle 12, the operator 18 needs to be aware of the presence of the passing-vehicle 66 before assuming manual control of the host-vehicle 12 to avoid a sudden lane-change by the host-vehicle 12 toward the passing-vehicle 66. Accordingly, the controller 30 may be configured to classify the passing vehicle as a primary-target 44, so the presence of the passing-vehicle 66 is likely something the operator 18 should be aware of before the hand-over 40 is completed. However, in this non-limiting example, the operator 18 has not exhibited a gaze-direction 26 towards the passing-vehicle 66 for longer than the primary-time 62.

In response to this expectation, the system 10 may include an alert-device 68 perceivable by the operator 18 that is in communication with controller-circuit 30 via an output 70. The alert-device 68 may consist of or include, but is not limited to, a reconfigurable display on dashboard or heads-up-display, a speaker that outputs a voice notification such as "perform visual scan", an arrangement of lights located to attract the attention of the operator 18, or any combination thereof. The alert-device is configured to be operable by the controller 30 to indicate to the operator 18, for example, a direction toward the instance of the primary-target 44 that needs to be seen by the operator 18. Information conveyed to the operator 18 by the alert-device 68 may include, but is not limited to, a specific direction and distance to the target, a direction only, which of portions of 360 degrees, e.g. which quadrant (e.g. forward-left, rear-right, etc.) where one or more primary-targets that have not been gazed at more recently than the primary-time is located.

It is contemplated that there may be instances of the targets 22 that are less important than a primary-target, but more important than an ignored-target. For example, FIG. 2 shows a following-vehicle 72 traveling at essentially the same speed as the host-vehicle 12. While the operator 18 should not ignore the following-vehicle 72, the operator 18 may not need to gaze at the following-vehicle as frequently as instance of the targets that are forward of or immediately beside the host-vehicle 12. Accordingly, the classification 42 may include a secondary-target 74. By way of a further exemplary distinction, an instance of the primary-target 44 may be another vehicle moving closer to host-vehicle 12 or the pedestrian 50 in or moving toward travel-path 54 of host-vehicle 12, and an instance of the secondary-target 74 may be another-vehicle not moving closer to the host-vehicle, i.e. moving at same speed and direction, or moving away from the host-vehicle 12. Since the secondary-target 74 may not need to be viewed or gazed at are often as an instance of the primary-target 44, the verification 60 may include or be configured to verify that the operator 18 has gazed at each instance of the secondary-target more recently than a secondary-time 76 (e.g. 5 seconds), where the secondary-time 76 greater than the primary-time 62.

It is contemplated that the classification 42 of some instances of the targets 22 may need more information than what is available from the object-detector 20, and/or the view from the object-detector 20 to some object may be blocked or otherwise obstructed. Accordingly, the system 10 may include a digital-map 78 that indicates locations of instance of a primary-target 44 and/or a secondary-target 74 proximate to the host-vehicle 12. By way of example and not limitation, instance of the targets 22 depicted in the digital-map 78 may include the traffic-signal 48 or STOP-sign (not shown), and/or define boundaries of non-drivable areas such as a cliff.

Situations may arise when it is difficult to determine the gaze-direction 26 of the operator 18 because, for example, the operator is wearing dark glasses, and/or there are instances of the primary-targets 44 that are so close together that a change in the gaze-direction 26 necessary to view each instance of the primary-targets, is difficult to distinguish. Accordingly, the verification 60 may include as an addition or alternative to monitoring the gaze-direction 26 that the operator 18 has performed a visual-sweep 80 around the host-vehicle 12 more recently than a sweep-time 82. If the gaze-direction 26 can't be detected or distinguished, movement of the head of the operator 18 may be tracked to determine that the visual-sweep 80 has been performed by the operator 18. Requirements for completing the visual-sweep 80 may include looking at the rear-view and side-view mirrors, a general scan of the area forward of the host-vehicle, and moving the head enough to indicate that the blind-spots have been checked.

Figure 3:
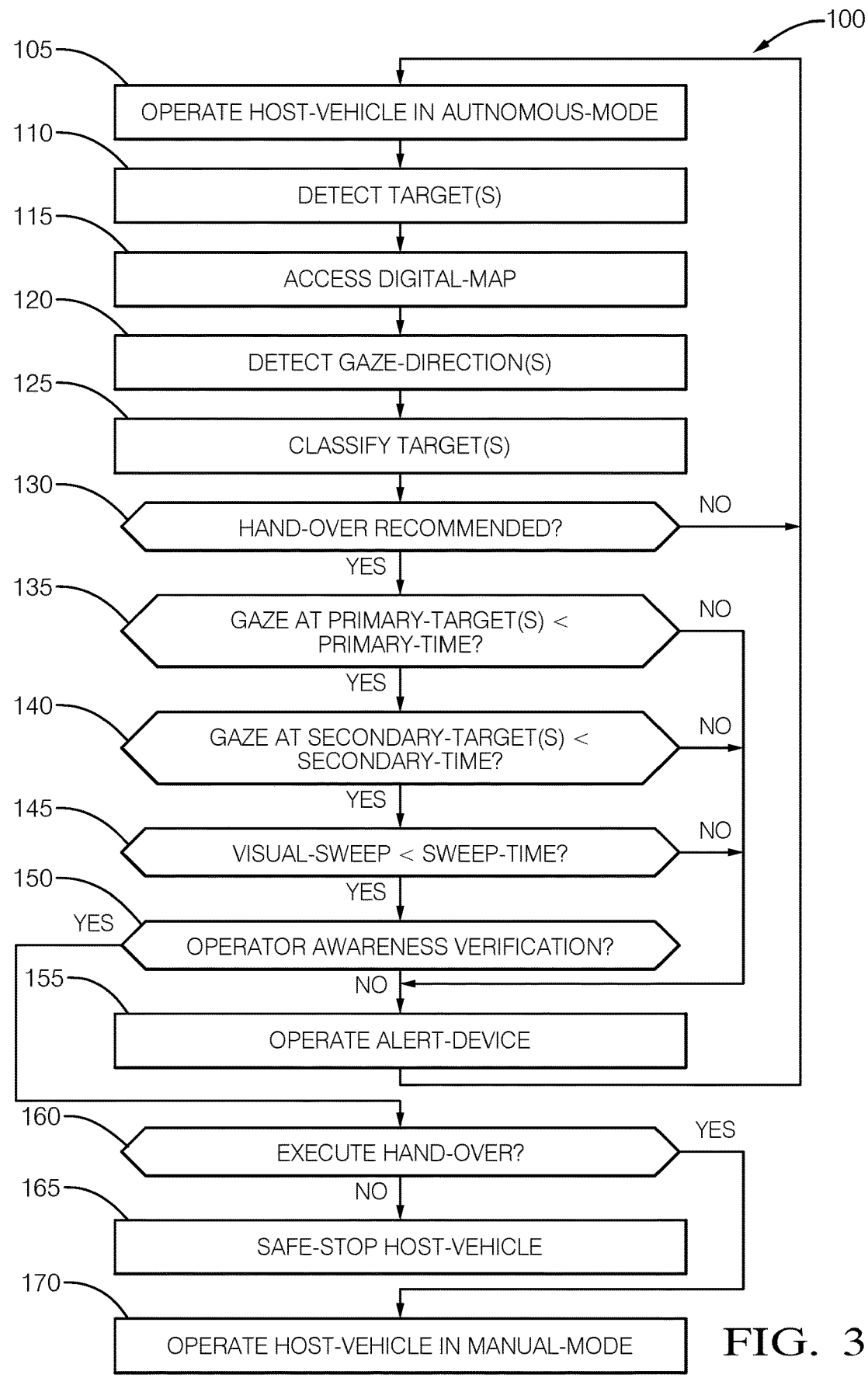
FIG. 3 is a method of operating the system of FIG. 1 in accordance with one embodiment.

FIG. 3 illustrates a non-limiting example of a method 100 for operating a vehicle, e.g. the host-vehicle 12.

Step 105, OPERATE HOST-VEHICLE IN AUTONOMOUS-MODE, may include the operator 18 merely specifying or inputting a destination, and the controller 30 taking control of the host-vehicle 12 by operating the vehicle-controls 28 to 'drive' the host-vehicle 12 to the destination in an autonomous-mode 14. The host-vehicle 12 is also operable and a manual-mode 16 where the operator 18 manually controls one or more of the steering, brakes, and accelerator of the vehicle-controls 28. As will become apparent in the description below, one aspect of the method 100 is to verify that the operator 18 is aware of relevant objects proximate to the host-vehicle 12 before a transition from the autonomous-mode 14 to the manual-mode 16 is completed.

Step 110, DETECT TARGET(S), may include detecting, with the object-detector 20, one or more targets 22 proximate to a host-vehicle 12. The controller 30 may be configured or programmed to process one or more signals from the object-detector 20 to detect and/or track the one or more targets 22.

Step 115, ACCESS DIGITAL-MAP, may include accessing a digital-map 78 that indicates one or more instance of a primary-target 44 and/or a secondary-target 74 proximate to the host-vehicle 12. The digital-map 78 may be stored in the memory 34 on board the host-vehicle 12, or may be stored in the cloud and remotely accessed from the host-vehicle 12.

Step 120, DETECT GAZE-DIRECTION(S), may include detecting, with an operator-monitor 24, a gaze-direction 26 of an operator 18 of the host-vehicle 12. The gaze-direction 26 may be characterized by an azimuth angle relative to a longitudinal-axis of the host-vehicle, and an elevation angle relative the longitudinal-axis or level with respect to gravity.

Step 125, CLASSIFY TARGET(S), may include determining a classification 42 of each target 22 detected by the object-detector 20. The values or types of the classification 42 may include, but is not limited to a primary-target 44, a secondary-target 74, and an ignored-target 46. The classification 42 may be based on, but not limited to, the relative position of the target, e.g. forward, beside, or behind the host-vehicle 12, within, near, or outside of the travel-path 54 of the host-vehicle, and/or relative movement, e.g. toward or away from the host-vehicle 12. The classification 42 may also take into consideration an identification of the target 22, e.g. traffic-signal 48, pedestrian 52, other-vehicle 52, or stationary object such as a trash-receptacle 58.

Step 130, HAND-OVER RECOMMENDED?, may include determining that a hand-over 40 of operation of the host-vehicle 12 from the autonomous-mode 14 to the manual-mode 16 is recommended because, for example, one or more of the devices that forms the object-detector 20 has malfunctioned or has been damaged.

Step 135, GAZE AT PRIMARY-TARGET(S)<PRIMARY-TIME?, may include determining that the operator 18 has gazed at each instance of the primary-target 44 more recently than a primary-time 62. That is, less than the primary-time 62 has passed since the operator 18 looked at or gazed at every instance of the targets 22 classified as a primary-target 44.

Step 140, GAZE AT SECONDARY-TARGET(S)<SECONDARY-TIME?, is an optional step that may include determining that the operator 18 has gazed at each secondary-target 74 more recently than a secondary-time 76, where the secondary-time 76 greater than the primary-time 62.

Step 145, VISUAL-SWEEP<SWEEP-TIME?, in an optional step that may include determining the operator 18 has performed a visual-sweep 80 around the host-vehicle 12 more recently than a sweep-time 82

Step 150, OPERATOR AWARENESS VERIFICATION?, may include performing a verification 60 that the tests performed by steps 135, 140 and 145 have been passed, or at least those steps that are performed. If the verification 60 is confirmed, then the method proceeds to step 160 to execute the hand-over 40. Otherwise, if one or more of steps 135, 140, and 145 did not pass, the method 100 proceeds to step 155 to activate the alert-device 68. In addition to one or more of steps 135, 140, and 145, the verification 60 may include confirming that the operator 18 has grasped or touched the hand-wheel which controls the steering of the host-vehicle, and the operator's feet are suitably positioned to operate the brakes and accelerator of the host-vehicle 12.

Step 155, OPERATE ALERT-DEVICE, may include operating an alert-device to indicate to the operator 18 a direction toward one or more primary-targets 44 that have not been gazed at more recently than the primary-time 62 and/or one or more secondary-targets 74 that have not been gazed at more recently than the secondary-time 76 and/or that the visual-sweep 80 has not been performed in more recently than the sweep-time 82.

Step 160, EXECUTE HAND-OVER?, may include in response to the verification, executing the hand-over 40 by stopping automated control of the vehicle-controls 28 and/or providing some indication that the manual-mode 16 is engaged. The indication may be a voice message emitted from a speaker, e.g. "manual drive engaged" or "automated drive terminated", and/or illuminating an indicator on the dashboard of the host-vehicle 12.

Step 165, SAFE-STOP HOST-VEHICLE, may include maintaining operation in the autonomous-mode 14 until the controller 30 can steer the host-vehicle 12 to a shoulder of the roadway and stop, or take an exit ramp and find a suitable parking place. This step may be taken if the operator 18 is for some reason unable to satisfactorily visually scan the area around the host-vehicle 12 in preparation to taking manual control of the host-vehicle 12.

Step 170, OPERATE HOST-VEHICLE IN MANUAL-MODE, may include the operator 18 continuing to operate the vehicle-controls 28 until circumstances are such that operating the host-vehicle in the autonomous-mode 14 can be resumed.

Described herein is a first device 30 that includes one or more processors 32; memory 34; and one or more programs 105-170 stored in memory 34. The one or more programs 105-170 including instructions for performing all or part of the method 100. Also, described herein is a non-transitory computer-readable storage-medium 34 comprising one or more programs 105-170 for execution by one or more processors 32 of a first device 30, the one or more programs 105-170 including instructions which, when executed by the one or more processors 32, cause the first device 30 to perform all or part of the method 100.

Accordingly, a system 10, a controller 30 for the system 10, and a method 100 of operating the system 10 are provided. The system 10 and the method 100 are useful to determine that the operator is ready to assume manual control of the host-vehicle 12 when, for any number of reasons, it is advisable to transition operation from the autonomous-mode 14 to the manual-mode 16.

While this invention has been described in terms of the preferred embodiments thereof, it is not intended to be so limited, but rather only to the extent set forth in the claims that follow.

We claim:

1. A system for operating a vehicle, said system comprising:
   an object-detector used to detect one or more targets proximate to a host-vehicle, said host-vehicle operable in an autonomous-mode and a manual-mode;
   an operator-monitor used to detect a gaze-direction of an operator of the host-vehicle; and
   a controller-circuit in communication with the object-detector and the operator-monitor, said controller-circuit configured to determine a classification of each target detected by the object-detector, said classification includes a primary-target and an ignored-target, determine that a hand-over of operation of the host-vehicle from the autonomous-mode to the manual-mode is recommended, perform a verification that the operator has gazed at each primary-target more recently than a primary-time, and in response to the verification, execute the hand-over.

2. The system in accordance with claim 1, wherein the system includes an alert-device operable to indicate to the operator a direction toward one or more primary-targets that have not been gazed at more recently than the primary-time.

3. The system in accordance with claim 1, wherein the classification includes a secondary-target, and the verification includes that the operator has gazed at each secondary-target more recently than a secondary-time, said secondary-time greater than the primary-time.

4. The system in accordance with claim 1, wherein the system includes a digital-map that indicates a primary-target proximate to the host-vehicle.

5. The system in accordance with claim 1, wherein verification includes that the operator has performed a visual-sweep around the host-vehicle more recently than a sweep-time.

6. A controller-circuit for operating a vehicle, said controller-circuit comprising:
   a first-input configured to communicate with an object-detector used to detect one or more targets proximate to a host-vehicle, said host-vehicle operable in an autonomous-mode and a manual-mode;
   a second-input configured to communicate with an operator-monitor used to detect a gaze-direction of an operator of the host-vehicle; and
   a processor in communication with the object-detector and the operator-monitor, said processor configured to determine a classification of each target detected by the object-detector, said classification includes a primary-target and an ignored-target, determine that a hand-over of operation of the host-vehicle from the autonomous-mode to the manual-mode is recommended, perform a verification that the operator has gazed at each primary-target more recently than a primary-time, and in response to the verification, execute the hand-over.

7. The controller-circuit in accordance with claim 6, wherein the controller-circuit includes
   an output configured to communicate with an alert-device operable to indicate to the operator a direction toward one or more primary-targets that have not been gazed at more recently than the primary-time.

8. The controller-circuit in accordance with claim 6, wherein the classification includes a secondary-target, and the verification includes that the operator has gazed at each secondary-target more recently than a secondary-time, said secondary-time greater than the primary-time.

9. The controller-circuit in accordance with claim 6, wherein the controller-circuit includes a digital-map that indicates a primary-target proximate to the host-vehicle.

10. The controller-circuit in accordance with claim 6, wherein verification includes that the operator has performed a visual-sweep around the host-vehicle more recently than a sweep-time.

11. A method for operating a vehicle, said method comprising:
- detecting, with an object-detector, one or more targets proximate to a host-vehicle, said host-vehicle operable in an autonomous-mode and a manual-mode;
- detecting, with an operator-monitor, a gaze-direction of an operator of the host-vehicle;
- determining a classification of each target detected by the object-detector, said classification includes a primary-target and an ignored-target;
- determining that a hand-over of operation of the host-vehicle from the autonomous-mode to the manual-mode is recommended;
- performing a verification that the operator has gazed at each primary-target more recently than a primary-time; and
- in response to the verification, executing the hand-over.

12. The method in accordance with claim 11, wherein the method includes
- operating an alert-device to indicate to the operator a direction toward one or more primary-targets that have not been gazed at more recently than the primary-time.

13. The method in accordance with claim 11, wherein the classification includes a secondary-target, and performing the verification includes that the operator has gazed at each secondary-target more recently than a secondary-time, said secondary-time greater than the primary-time.

14. The method in accordance with claim 11, wherein the method includes
- accessing a digital-map that indicates a primary-target proximate to the host-vehicle.

15. The method in accordance with claim 11, wherein the method includes
- verifying that the operator has performed a visual-sweep around the host-vehicle more recently than a sweep-time.

* * * * *